United States Patent [19]
Baumann

[11] 3,937,441
[45] Feb. 10, 1976

[54] ROTARY VALVE

[76] Inventor: Hans D. Baumann, 29 Villa Drive, Foxboro, Mass. 02035

[22] Filed: Feb. 21, 1975

[21] Appl. No.: 551,519

[52] U.S. Cl. ............ 251/298; 137/315; 137/454.2; 137/527; 251/292; 251/315
[51] Int. Cl.² .......................................... F16K 1/18
[58] Field of Search .......... 251/292, 298, 152, 315, 251/308, 304, 305, 309; 137/315, 454.2, 251/527, 527.2, 527.4, 527.8

[56] References Cited
UNITED STATES PATENTS

| | | |
|---|---|---|
| 556,636 | 3/1896 | Kuichling et al................ 137/527.2 |
| 846,317 | 3/1907 | Kiddle.............................. 137/527.4 |
| 3,148,695 | 9/1964 | Groen, Jr. et al.................. 251/315 |
| 3,601,360 | 8/1971 | Scaramucci........................ 251/304 |
| 3,666,234 | 5/1972 | Scaramucci...................... 137/454.2 |

*Primary Examiner*—William R. Cline
*Assistant Examiner*—H. Jay Spiegel

[57] ABSTRACT

A rotary valve having a segmental sphere type rotary plug cooperating with sealing means and featuring a slide-in cage arrangement for ease of machining and assembly, and wherein said rotary plug is locked into said cage type insert by means of cylindrical guide bushings which can be removed only after the cage type insert is retracted from the valve housing.

5 Claims, 3 Drawing Figures

U.S. Patent  Feb. 10, 1976  3,937,441
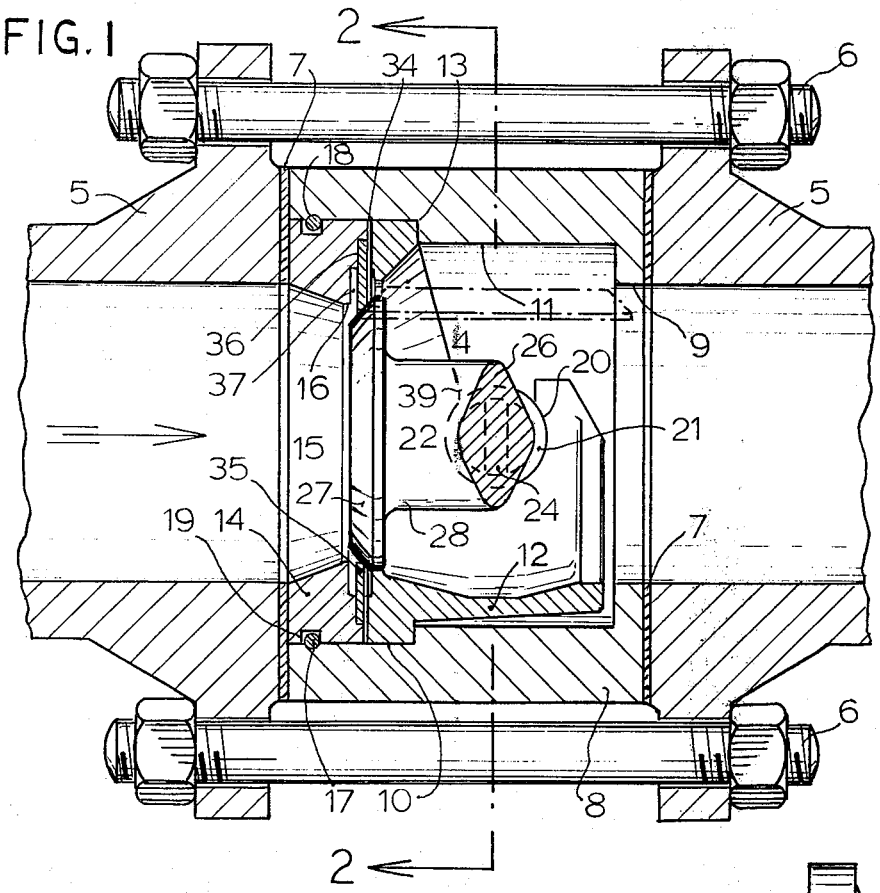
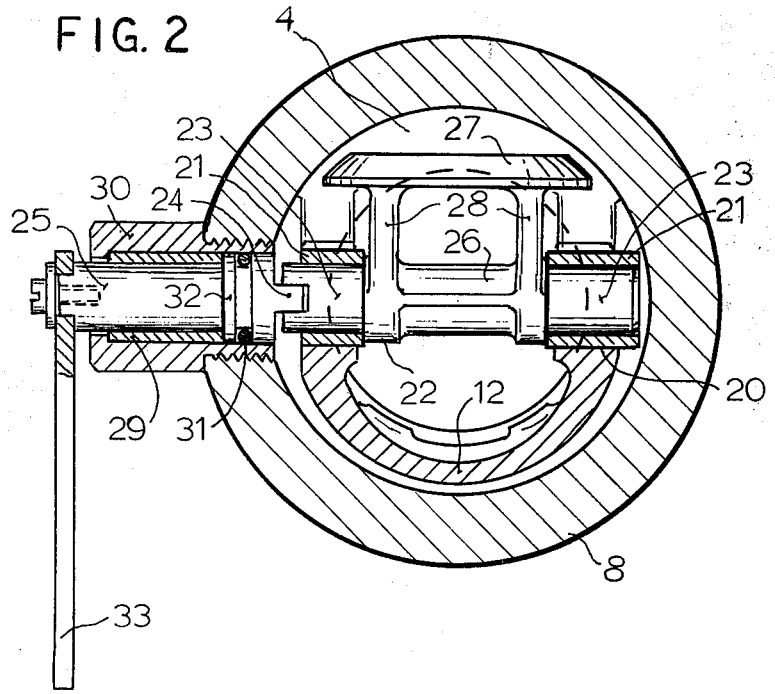
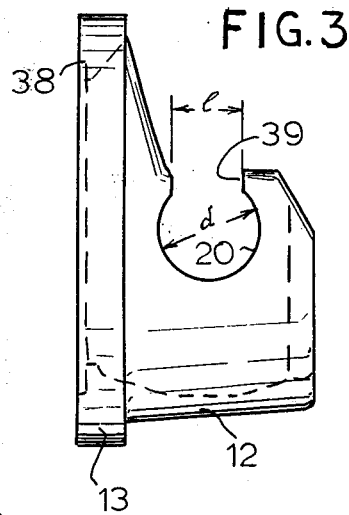

3,937,441

ROTARY VALVE

BACKGROUND OF THE INVENTION

This invention relates to valves used for the control of liquids or gases and which opening or closing action is dependent on a rotary valve stem motion caused manually or by automatic actuating means. More specifically, my invention relates to so-called ball valves, featuring usually a spherical plug with a cross-bore located between a pair of plastic seal rings and rotable over a 90° quadrant between the open and closed position.

For high pressure service, these highly polished and precision ground balls or spheres have to be supported by journal bearings located externally of the sphere and within the surrounding housing. Such construction, in turn, requires housings made of two separate halves either screwed or welded together. The cost of producing such relatively complicated housings and balls with forged or cast-on bearing stubs is high. The main objective of my invention is therefore to retain a one-piece housing and to eliminate the use of a difficult to machine completely spherical ball plug which, in turn, enables the placement of the required journal bearings inside the housing bore, thereby effecting great cost savings.

Another object of my invention is the provision of an insert type trim arrangement, allowing quick removal of all functional parts from the housing for better servicing and speedy assembly. A type of insert type ball or butterfly valve has been known and is described in U.S. Pat. No. 3,636,972. However, the described construction is featuring a valve assembly inserted within a housing and in the process providing a cavity between said insert and housing bore to enable circulation of a heating or cooling fluid around the inner valve assembly. Furthermore, while U.S. Pat. No. 3,636,972 shows an embodiment (FIG. 6 or FIG. 7) indicating a butterfly valve with an eccentric vane, which shows some remote similarity with my invention, there is no indication of how valve stems 324 or 322 can be removed from the one-piece tubular valve body 312, i.e. the patent indicates an un-workable design. My invention, on the other hand, teaches the use of removable bearing bushings which effectively lock the plug bearing stubs in position, once the valve is assembled, thereby completely eliminating the use of pins, screws or other fastening devices, which could become dislodged during service and thereby greatly impair the reliability of such a valve.

Yet, another object of my invention is the use of a flexible plastic seal, which is fluid pressure actuated and which is backed-up by a stainless steel sealring, which comes into play, in case the plastic seal is destroyed, thereby providing additional fire safety.

Other objects and advantages will be readily apparent from the following detailed description.

BRIEF DESCRIPTION OF THE DRAWINGS

FIG. 1 is a vertical, sectional view of a valve constructed in accordance with my invention, with the valve being illustrated as part of a fluid system and assembled between a pair of mating flanges.

FIG. 2 is a sectional view taken along lines 2—2 of FIG. 1, and wherein the valve is shown with the plug in the open position (as indicated by dashed lines in FIG. 1), and wherein the view of the mating flange is omitted.

FIG. 3 is an external view of the cage 12 supporting the valve plug and journal bearings 21, indicated in FIGS. 1 and 2, for added clarity.

DESCRIPTION OF THE PREFERRED EMBODIMENT

Referring to the drawings in detail and particularly FIG. 1, the invented valve indicated by reference character 4 is clamped between two mating pipe flanges 5 by means of tie-rods 6, constituting parts of a fluid carrying piping system. Gaskets 7 prevent external leakage of the fluid. Valve 4 consists of a tubular housing 8 which, in smaller sizes, can conveniently be made out of steel bar stock. Said housing has flat opposite ends which match and seal against gaskets 7 and a bore 9 which extends lengthwise through the housing 8 and is provided with two counter bores 10 and 11. The latter extending through the major portion of the length of the housing and containing within a cage 12, of which the radially outwardly extending flange 13 abuts against the terminating face of counter bore 10. The latter counter bore 10 facing towards the high pressure or inlet side of the valve also contains a slidingly engaged ring member 14, having a conical bore 15 defining at its reduced diameter 16 a valve orifice. A circularly cross-sectioned snap-ring 17, made from suitably hardened spring wire, engages with a circular groove 18 cut radially outward into a counter bore 10 and with an opposing rectangular groove 19 cut into ring member 14 to retain the latter during times, where valve 4 is not clamped between flanges. Circular groove 18 is sufficiently shallow to allow snap-ring 17 to disengage whenever moderate force is applied on cage 12, and thereby allow disassembly of the internal valve parts.

Referring back to cage 12, which is preferredly cast out of iron and has a cup shape or cradle style cross-section, more clearly shown in FIG. 2. Each side of the cradle has a cross-bore 20 located perpendicular to but on the same level as the longitudinal valve axis and containing within a pair of guide bushings 21, made from bronze or other suitable bearing material, which support, in turn, a rotable valve plug 22; the latter consisting of a pair of bearing stubs 23, of which one is slotted to accept the male tongue 24 of a drive shaft 25, separated by a ribbed center stud 26, which is supporting a spherically machined head 27 connected by two arms 28. As shown in FIG. 2, drive shaft 25 is guided within a bearing bushing 29 supported by a steel neck 30, suitably fastened to housing 8. An O-ring seal 31 located in a groove cut into the thickened portion 32 of drive shaft 25 prevents external leakage of pressurized fluid from the valve interior. Finally, a lever 33 is connected onto drive shaft 25 to rotate plug 22 manually. However, it should be understood that such rotation can just as well be performed by some automatic actuating device such as pneumatic cylinders without departing from the spirit and scope of my invention.

The position of the valve plug 22, as shown in FIG. 2, is that of valve 4 in the wide-open position. However, when plug 22 is rotated 90°, as shown in FIG. 1, the head portion 27 is blocking valve orifice 16 and, at the same time, engages with its spherical periphery a thin metallic circular sealring 34 which is clamped between ring member 14 and flange 13 of cage 12. Head portion 27 also engages with another sealring 35, made from a corrosion and heat resistant plastic material, contained within a recess 36 of ring member 14. The depth of this recess is slightly shallower than the thickness of sealring 35 to allow a certain amount of controlled compression, in order to prevent leakage by the recessed face of ring member 14. Both sealrings 34 and 35 have an inside diameter roughly corresponding with the diameter of the valve orifice 16 and about equal to the distance between the sealrings and the axis of the bearing stubs. However, the diameter is slightly smaller than the correspondingly engaging spherical head diameter of plug 22, thereby causing some minute deflection of both seals towards the up-stream side of the valve and, in turn, providing a certain pre-load towards the plug to aid in the sealing effort. An undercut 37 in ring member 14 allows space for this deflection. Fluid pressure difference between the high and low pressure sides of the valve acts on the ringshaped area formed between the diameter at the interface between seals and plug head 27 on the one side and a larger support diameter 38 of cradle 12. It is therefore apparent that the pre-load of the gasket is increased and sealing therefore made more effective, the higher the fluid pressure differential becomes.

The metallic sealring will still be effective, in case an external fire should destroy the primary plastic sealring, thus providing added reliability.

Once assembled, cage 12, plug 22, and guide bushings 21 can easily be slid into and out of housing 8, as long as plug 22 is in the open-position, i.e. tongue 24 is in the horizontal position. However, once inside the housing 8, plug 22 should be retained permanently within cradle 12 to assure proper performance of the valve. Prior state of the art valves of this type employ removable valve shafts, which are drilled and pinned to the valve plug. Such methods proved very cumbersome, since it made subsequent dis-assembly for repair or maintenance extremely difficult and, on the other hand, caused safety hazards, since pins could become loose in service and interfere with the operation of the valve. On the other hand, removable shafts require a greatly thickened hub, i.e. sufficient wall thickness has to be added to the shaft diameter, thereby blocking the through flow passage of the valve and, in turn, greatly diminish its flow capacity.

In my invention, on the other hand, both bearing stubs are simple to machine end portions of a common plug casting having a streamlined center stud 26 to provide minimum fluid resistance in the open valve position. Referring to FIG. 3, cage 12 has milled slots 39 of which the width indicated as "$l$" is only slightly larger than the diameter of bearing studs 23, thereby permitting the insertion of plug 22 through the open top part of cradle 12, once the latter is removed from housing 8. However, when guide bushings 21 are inserted at the same time (in the direction of the bearing stub axis) into cross bores 20 and over said bearing stubs, then it is no longer possible to remove plug 22 from cradle 12, since the diameter of cross bores 20, indicated as "$d$" in FIG. 3, is substantially larger than the width "$l$" of slot 39. Bushings 21 are, in turn, prevented from sliding out of cross bores 20 by tongue 24 on one side and the inner wall of housing 8 on the other side, thereby providing a very reliable but safe retaining system for plug 22.

While the invention has been illustrated in a preferred configuration, allowing the installation of the valve between a pair of companion flanges, it should be understood nevertheless, that a pair of flanges could be added to housing 8 to aid in the installation or, that housing 8 could be provided with pipe threads on either end to permit a screwed pipe connection. Furthermore, ring member 14 could be attached by external flange means to housing 8 without departing from the scope of my invention, as defined in the following claims.

I claim:

1. A rotary valve comprising:
   a. a tubular housing having a longitudinal central bore extending throughout its length;
   b. an inlet and outlet end formed in said housing;
   c. a counter bore formed in said housing and extending from the inlet end of said housing towards a stop shoulder, providing at that point a reduced cross-section;
   d. a cradle shaped cage assembly removably placed within said housing bore and having a raised diameter portion slidingly engaging the counter bore of said housing and abutting the stop shoulder within said housing;
   e. a bore or passage extending throughout the central length of the cradle shaped cage;
   f. a ring member guiding closely and being retained by suitable means within said housing and having a central bore defining a valve orifice;
   g. one or more sealing rings suitably retained between the terminating face of the raised diameter portion of said cage facing the valve inlet on one side and one terminating surface of the engaged ring member within said housing on the other side and having an inner diameter essentially equal to that of the valve orifice;
   h. a pair of openings located perpendicularly to the longitudinal valve axis and within the walls of said cradle shaped cage, each consisting of a circular bore intersected by a vertical slot communicating with the upper open portion of the cage and having a width substantially less than the diameter of said circular bore;
   i. a rotating plug tiltingly engaged within said cage and consisting of two circular bearing stubs which slidingly fit through said vertical slots of the cradle shaped cage, separated and connected with each other by a central hub and said plug having a spherical head portion suitably connected to the hub, said head portion engaging and cooperating with the inner bore of said sealingrings in the closed valve position;
   j. a pair of guide bushings slidingly engaged over said bearing stubs and within said circular bores located perpendicularly to the longitudinal valve axis within said cage, thereby effectively retaining the rotating plug within the cage;
   k. means to engage one of said bearing stubs and to tiltingly move the rotating plug.

2. A rotary valve of claim 1, wherein said means to tiltingly move the rotating plug comprises a drive shaft radially inwardly penetrating through said housing, and wherein said drive shaft engages by means of tongue and groove with one of the two bearing stubs of said valve plug.

3. A rotary valve of claim 1, wherein one of said sealrings is made of thin, flexible metal sheet having an inside diameter slightly less than the corresponding diameter of said spherical head portion to provide some deflection and preloading of said sealring.

4. A rotary valve of claim 1, wherein a second sealring is placed within a recess of said ring member, and wherein the depth of said recess is slightly shallowe than the thickness of the second sealring to allow for a controlled amount of compression for the prevention of leakage past the sealring and the ring member.

5. A rotary valve of claim 1, wherein said means to retain the ring member within the housing comprises a snap-ring cooperating with a shallow groove cut radially outwardly into said housing and an opposite deeper groove within the periphery of said ring member.

* * * * *